United States Patent [19]

Katzenstein

[11] Patent Number: 4,752,776
[45] Date of Patent: Jun. 21, 1988

[54] IDENTIFICATION SYSTEM

[75] Inventor: Henry S. Katzenstein, Pacific Palisades, Calif.

[73] Assignee: Enguvu AG/SA/Ltd., Baar, Switzerland

[21] Appl. No.: 840,318

[22] Filed: Mar. 14, 1986

[51] Int. Cl.$^4$ .................. H04Q 7/00; G08C 19/00
[52] U.S. Cl. .................. 340/825.54; 340/825.72; 340/825.73; 340/825.34
[58] Field of Search .................. 340/825.54, 825.57, 340/825.64, 825.71, 825.72, 825.73, 825.31, 825.34; 343/6.5 R, 6.8 R, 6.55 S; 235/380

[56] References Cited

U.S. PATENT DOCUMENTS

| | | | |
|---|---|---|---|
| 3,440,633 | 4/1969 | Vinding | 340/825.54 |
| 4,087,791 | 5/1978 | Lemberger | 340/825.54 |
| 4,209,783 | 6/1980 | Ohyama et al. | 340/825.54 |
| 4,364,043 | 12/1982 | Cole et al. | 340/825.54 |
| 4,463,353 | 7/1984 | Kuzara | 340/825.54 |
| 4,473,825 | 9/1984 | Walton | 340/825.54 |
| 4,510,495 | 4/1985 | Sigrimis et al. | 340/825.54 |
| 4,630,044 | 12/1986 | Polzer | 340/825.54 |

Primary Examiner—Robert L. Griffin
Assistant Examiner—Ralph E. Smith
Attorney, Agent, or Firm—Ellsworth R. Roston; Charles H. Schwartz

[57] ABSTRACT

A reader identifies information, such as the identity of an object at a transponder, provided in binary form by the transponder. The reader initially generates a pulse which activates the transponder into transmitting a series of signals, such as by magnetic induction, to the reader. Upon each count of a particular number of signals in the reader, the reader generates an additional pulse which causes the transponder to transmit a new series of signals to the reader. The generation of the pulses by the reader may occur through the charge and discharge of energy in a storage member such as a capacitance. The series of signals produced by the transponder may have either a first frequency or a second frequency. The signals may be generated in each sequence at the first and second frequencies in an order dependent upon (a) the binary code identifying the object at the transponder and (b) the polarity of the pulse produced by the transponder in such sequence. The reader then identifies the information by demodulating the signals received by it at the first and second frequencies. The reader is able to interrupt at any time the generation of the sequence of signals at the transponder when it does not receive the signals transmitted by the transponder. The reader then operates on a free running basis to generate pulses of opposite polarity at a relatively low frequency.

47 Claims, 3 Drawing Sheets

"1" TO TRANSFER DATA
"0" TO RESET

| INITIAL PULSE | DATA | |
|---|---|---|
| | 1 | 0 |
| + | O<br>H.F. | C<br>L.F. |
| − | L.F.<br>C | H.F.<br>O |

IDENTIFICATION SYSTEM

This invention relates to a system for identifying an object and more particularly relates to a system for identifying an object accurately and reliably in a minimal period of time. The invention further relates to a system which is immune to high levels of extraneous noise or small obstacles in the path of data transmission and which operates on a self-synchronous basis without any need to provide a source of energy at the object. The invention is also quite simple so that the transponder at the object can be incorporated into a single integrated chip and the reader displaced from the object can also be incorporated into a single integrated circuit chip.

As our society becomes increasingly complex, it becomes increasingly important to be able to identify different objects. For example, in an aircraft plant for manufacturing a jet airplane, thousands, and even tens of thousands, of different tools are required to manufacture the different parts incorporated into the airplane. It is accordingly important to be able to identify the individual tools quickly and reliably. One reason is that a fast and reliable identification of each individual tool is cost-efficient because it minimizes the time needed to identify such tool. Another reason is that a fast and reliable identification of each individual tool minimizes the possibility that the wrong tool will be selected and used on a workpiece, thereby causing the workpiece to be ruined or damaged.

It has been known for an extended period of time that it would be desirable to provide a system for obtaining a fast and reliable indication of objects such as tools. An extensive effort has accordingly been made by a wide variety of different parties to provide a satisfactory system. Such efforts have not been productive for a number of reasons. As a result, a satisfactory system still does not exist for identifying objects such as tools.

The systems now in use are undesirable for a number of reasons. They are not fast. For example, some of the systems use at the object a transponder which stores energy received from a remote reader and which then generates a code after such storage of energy. The energy is stored by charging a capacitance at the transponder. Other systems sweep a range of frequencies and detect the perturbations produced at individual frequencies in such frequency range. As will be appreciated, both types of systems are relatively slow.

The systems now in use have other severe limitations. The systems are not self synchronous. In other words, the systems do not operate on the basis of clock signals internally generated in the system. As a result, the systems sometimes provide the reader with false and inaccurate indications of the code identifying the object at the transponder. This causes an improper object to be identified sometimes at the reader.

The systems now in use also have other critical limitations. For example, the systems now in use are sometimes responsive to extraneous signals. Furthermore, in the systems now in use, members in the path between the transponder and the reader sometimes block the reception by the reader of the identifying signals transmitted by the transponder. This blockage has occurred even when the members in the path are relatively small. These problems have been exacerbated by the fact that the systems now in use are not self-synchronous. This has caused the systems now in use to identify objects improperly.

The systems now in use are also relatively complicated. This has caused the systems now in use to be excessively large from the standpoint of the space occupied by such systems. It has also prevented the systems now in use from taking advantage of integrated circuit technology. For example, it would be desirable to dispose the transponder on a single integrated circuit chip and to dispose all, or at least substantially all, of the reader components on another integrated circuit chip.

This invention provides a system which overcomes the above disadvantages. The system is fast, accurate and reliable. It operates on a self-synchronous and passive basis. It is immune to extraneous signals and it is effective even when small members are disposed between the transponder and the reader. It is simple and compact such that the transponder is disposed on a single integrated circuit chip and all, or substantially all, of the reader circuit is disposed on another single integrated circuit chip. It is quite tolerant of variations in the values of components so that it can be produced economically in quantity.

In one embodiment of the invention, a reader (which can also be considered to be an interrogator) identifies information, such as the identity of an object at a transponder, provided in binary form at the transponder. The reader initially generates a pulse which activates the transponder into transmitting a series of signals, such as by magnetic induction, to the reader.

Upon each count of a particular number of signals in the reader, the reader generates a new pulse which causes the transponder to produce a new series of signals. The generation of the pulses by the reader may occur through the charge and discharge of energy in a storage member such as a capacitance.

The series of signals produced by the transponder may have either a first frequency or second frequency. The signals may be generated at the first and second frequencies in each sequence in an order dependent upon (a) the binary code provided at the transponder and (b) the polarity of the pulse produced by the transponder in such sequence. The signals may be generated at the second frequency by connecting a capacitance across a coupling coil at the transponder. The reader then identifies the information by demodulating the signals received by it at the first and second frequencies.

The reader is able to interrupt at any time the generation of the sequences of signals at the transponder when it does not receive the signals transmitted by the transponder. The reader then operates on a free running basis to generate pulses of opposite polarity at a relatively low frequency. In this way, the reader is constantly prepared to activate the transponder when the transponder becomes subsequently disposed within the effective range of the reader.

Figure 1:
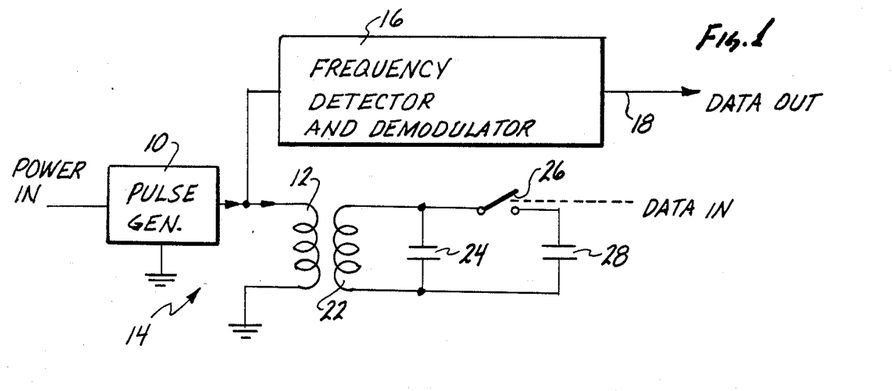
FIG. 1 is a simplified block diagram of a system constituting one embodiment of this invention for generating at a transponder information such as the indentification of an object, transmitting this information to a reader and identifying the information at the reader.

FIG. 1 shows a simplified diagram of one embodiment of a system constituting this invention. The embodiment shown in FIG. 1 includes a pulse generator 10 connected to a coil 12 at a reader generally indicated at 14. A frequency detector 16 is coupled to the coil 12 and output indications from the frequency detector are introduced to a line 18. A transponder generally indicated at 20 includes a coil 22. A capacitance 24 exists across the coil 22. A switch 26 and a capacitance 28 are also connected in series across the coil 22.

The coils 12 and 22 are constructed so that they are magnetically coupled to each other through a finite distance. This distance may be in the order of a few milliinches to a few feet. The coils 12 and 22 are further constructed so that they will not be responsive to magnetic signals extraneous to those generated by the coils 12 and 22.

Figure 8:
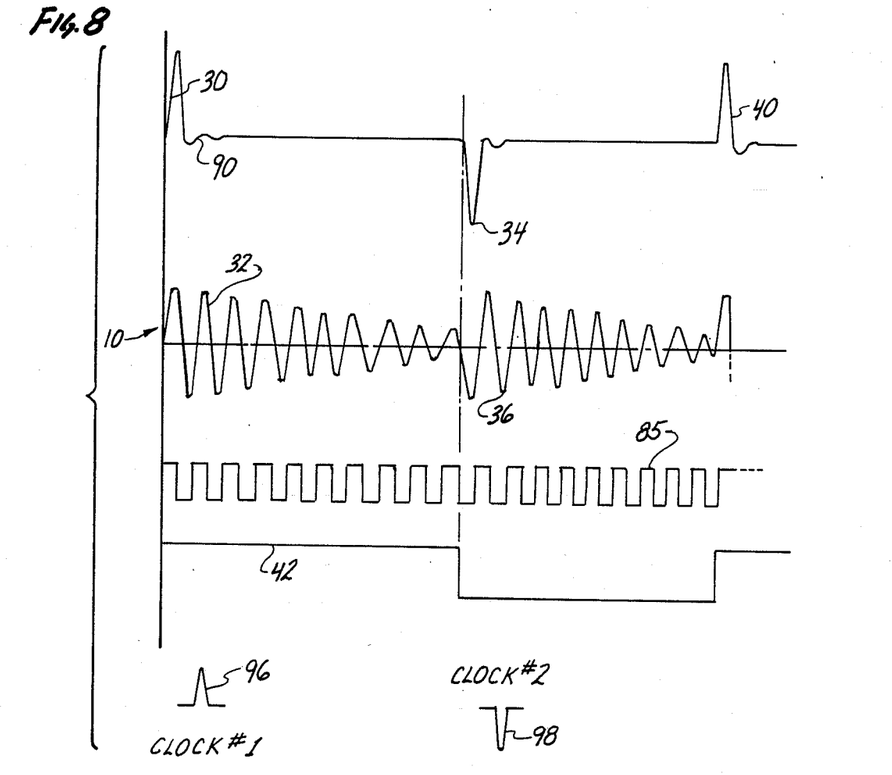
FIG. 8 illustrates wave forms of signals generated by the reader and the transponder.

To initiate the operation of the system shown in FIG. 1, the pulse generator produces a pulse indicated at 30 in FIG. 8. This pulse is coupled as by magnetic induction through the coil 12 to the coil 22 which produces a plurality of signals 32. These signals are limited in amplitude to produce signals 42 having rectangular characteristics. When the switch 26 is open, the coil 22 and the capacitance 24 form a resonant circuit which causes the signals 34 to have a first frequency such as three (3) megahertz. However, when the switch 24 becomes closed, the capacitance 28 becomes connected in parallel with each of the coil 22 and the capacitance 24. As a result, the signals generated by the transponder 20 have a second frequency such as two (2) megahertz.

The information, such as the indentification of the object, is transmitted in the form of a binary code constituting a plurality of bits each represented by a binary "1" or a binary "0". Or each binary bit, a sequence of signals at both the first and second frequencies is generated at the transponder 20. The order of generating the signals at the first and second frequencies in each sequence relative to the pulses such as the pulse 30 is dependent, at least in part, on the value of the binary bit being identified in that sequence.

The signals, such as the signals 32, generated in each plurality are magnetically coupled by the coil 22 to the coil 12 as by magnetic induction. The reader 14 then counts these signals. When the count reaches a particular value such as ten (10), the pulse generator 10 in FIG. 1 generates a new pulse such as that indicated at 34 in FIG. 8. This pulse has a polarity opposite to that of the pulse 30. This causes a plurality of signals, such as those indicated at 36 in FIG. 8 to be produced. The signals 36 correspond to the signals 32 except that they has a frequency different from the frequency of the signals 32. For example, the signals 36 have the second frequency if the signals 32 have the first frequency. Similarly the signals 36 have the first frequency if the signals 32 have the second frequency.

The signals 36 are then transmitted to the reader 14 and are counted at the reader. When the count reaches the particular value such as ten (10), the pulse generator 10 generates a pulse 40 (FIG. 8) in the coil 12. This pulse has the same polarity as the pulse 30. The generation of the pulse 40 causes the transponder 20 to generate a plurality of signals at one of the first and second frequencies. In this way, the reader 14 and the transponder 20 interact to provide for the generation of pulses, such as the pulses 30, 34 and 40, at the reader 14 and the generation of a plurality of signals at the transponder 20 in response to each of these pulses.

As will be appreciated, each sequence of signals is formed from a particular number (such as ten (10)) of signals at the first frequency and the particular number of signals at the second frequency. This means that the time required to produce each of the successive sequences is constant. In each sequence, the particular order of the signals at the first frequency and the signals at the second frequency controls the value of the binary bit represented by the sequence. This order is determined by the frequency detector 16 which demodulates the signals produced in the coil 12 at the first and second frequencies. The demodulated signal is indicated at 42 in FIG. 8. As will be seen, the demodulated signal in each sequence has two time portions of unequal duration. The duration of the time portion correponding to the signals at the first frequency (e.g. 3 megahertz) is shorter than the duration of the time portion corresponding to the signals at the second frequency (e.g. 2 megahertz).

Figure 2:
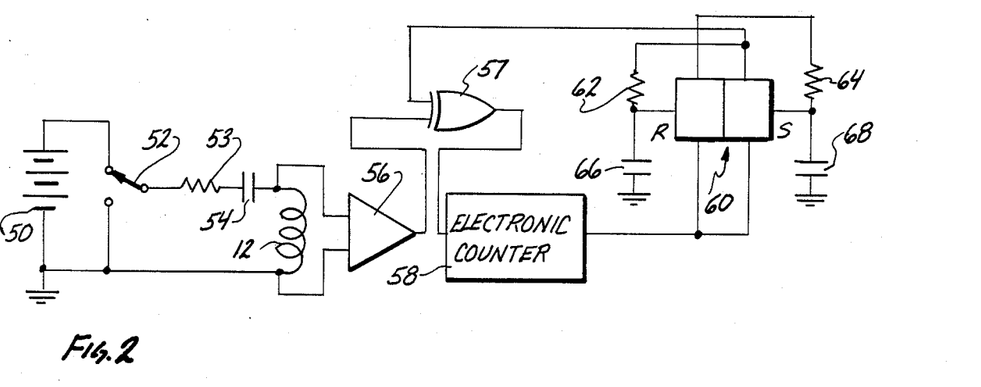
FIG. 2 is a circuit diagram, partly in block form, of the reader included in the system shown in FIG. 1.

FIG. 2 indicates additional details of the reader 14 shown in FIG. 1. The reader 14 shown in FIG. 2 includes a power source 50, such as a battery, constructed to provide a direct voltage. One terminal of the power source 50 may be connected to a reference potential such as ground. The stationary contacts of a switch 52 are connected to the opposite terminals of the power source 50. A connection is made from the movable arm of the switch 52 through a resistance 53 to one terminal of a capacitance 54. Although the switch 52 is shown as being mechanical, it will be appreciated that the switch 52 may be formed from electronic components such as semi-conductors, as will be seen in FIG. 3.

The coil 12 is connected in FIG. 2 between the second terminal of the capacitance 54 and the grounded terminal of the power source 50. The coil 12 and the resistance 53 may be constructed to damp any pulses, following such as the pulses 30, 34 and 40, produced in the coil 12. The coil 12 is also constructed to direct to the coil 22 magnetic flux produced in the coil 12 with a minimal leakage of flux in any other direction than in the direction toward the coil 22. By limiting the leakage of flux from the coil 12 to occur substantially only in a direction toward the coil 22, the coil 12 is substantially immune to stray magnetic fields. The coil 12 is also immune to interaction with magnetic or electrically conductive material which is not disposed in the path of the flux produced by the coil.

The two terminals of the coil 12 are connected to input terminals of a limiting amplifier 56. The output signals from the amplifier 56 are introduced to one input terminal of an "exclusive or" network, another input terminal of which receives signals from an output terminal of an astable multivibrator generally indicated at 60. The output signals from the "exclusive or" network 57 pass to the input terminal of a counter 58, the output from which passes to the input terminals of the clocked multivibrator 60. The multivibrator 60 has two (2) substantially identical inputs and a clock input, one of the identical inputs may be designated as a "set" input ("S") and the other such identical inputs may be designated as a "reset" input ("R"). The signals introduced to each input in the multivibrator 60 control the operation of an associated stage in the multivibrator.

First terminals of resistances 62 and 64 are respectively connected from the output terminal of each stage in the multivibrator 60 to the input terminal of the other stage in the multivibrator. Connections are respectively made from the second terminals of the resistances 62 and 64 to first terminals of capacitances 66 and 68, second terminals of which receive the reference potential such as ground. The signals of the output terminals of the two stages in the multivibrator control the position of the movable arm of the switch 52. The movable arm of the switch 52 is moved alternately upwardly and downwardly in accordance with the signals produced on the output terminals of the two stages in the multivibrator 60.

Figure 4:
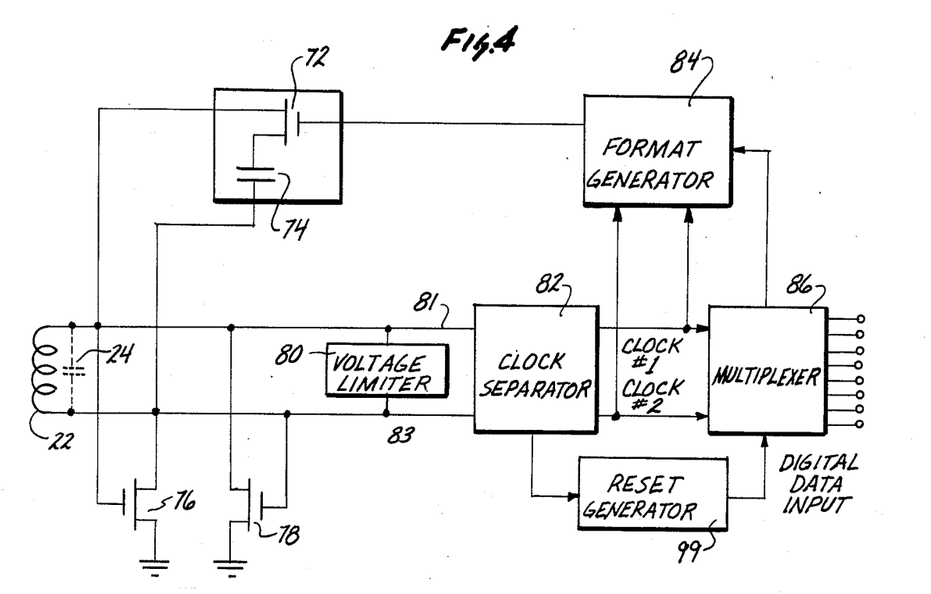
FIG. 4 is a circuit diagram, partly in block form, of the transponder included in the system shown in FIG. 1.

The transponder 20 is shown in additional detail in FIG. 4. It includes the coil 22 which is also shown in FIG. 1. A capacitance 24 is shown in broken lines as being connected across the coil 22. The capacitance is shown in broken lines because it may be considered to be formed from distributed capacitances in the coil 22 and in other elements in the circuitry shown in FIG. 4. If necessary, a discrete capacitance can be connected across the coil 22 and can be considered to be included in the distributed capacitance 24. The coil 22 and the capacitance 24 form a circuit which is resonant at the first frequency such as three (3) megahertz. This resonant circuit generates signals on a ringing basis in response to each pulse from the coil 12.

The drain of a transistor 72 is connected to a first terminal of the coil 22 and the source of the transistor 72 is connected to one terminal of a capacitance 74, the other terminal of which is common to the second terminal of the coil 22. The first terminal of the coil 22 is also common with the gate of a transistor 76 and the drain of a transistor 78. Connections are made from the second terminal of the coil 22 to the drain of the transistor 76 and the gate of the transistor 78. The sources of the transistors 74 and 76 are common with the reference potential such as ground. The transistors 74 and 76 may be field effect transistors.

A voltage limiter 80 is connected across the coil 22. The signals from the voltage limiter 80 are respectively introduced through lines 81 and 83 to the two (2) input terminals of a clock separator 82. The clock separator 82 has a first output alternately providing first clock signals representing a positive polarity in the excitation pulses such as the pulses 30, 34 and 40 and has a second output alternately producing second signals representing a negative polarity in such excitation pulses. The signals from the clock seaparator 82 are introduced to input terminals of a format generator 84 and a multiplexer 86. The output from the format generator 84 is introduced to the gate of the transistor 72. The format generator 84 also receives input signals from the multiplexer 86. Binary input information indentifying the object to be identified may be introduced to input terminals of the multiplexer 86 and may be stored in the multiplexer.

When the movable arm of the switch 52 engages the upper stationary contact of the switch as shown in FIG. 2, a circuit is established which includes the power source 50, the switch 52, the resistance 53, the capacitance 54 and the coil 12. This causes a surge of current to flow through the coil 12 to produce the pulse 30. The pulse is considerably damped, as indicated at 90 in FIG. 8, because of the construction of the coil 12 and the inclusion of the resistance 53.

The generation of the pulse 30 in the coil 12 causes the signals 32 to be produced in the transponder 20. These signals, in turn, cause signals to be coupled magnetically back into coil 12. These signals are limited in amplitude by the amplifier 56 and are then introduced through the "exclusive or" network 57 to the counter 58. When the count in the counter 58 reaches a particular value such as ten (10), the counter produces a signal to trigger the multivibrator 50 from one state of operation to the other. This causes a signal to be introduced to the switch 52 to actuate the movable arm of the switch from engagement with the upper stationary contact of the switch to engagement with the lower stationary contact of the switch.

When the movable arm of the switch 52 engages the lower stationary contact of the switch, the capacitance 54 becomes discharged through a circuit including the capacitance, the coil 12, the switch 52 and the resistance 53. As will be seen, the current flows through the coil 12, as a result of the discharge of the capacitance 54, is in an opposite direction from the current flowing through the coil 12 as a result of a charging of the capacitance. The pulse 34 generated in the coil 12 as a result of the discharge of the capacitance 54 accordingly has a polarity opposite to the polarity of the pulse 30. In this way, the pulses generated by the coil 12 alternately have one polarity and then the opposite polarity. This is indicated in FIG. 8 by a positive polarity for the pulses 30 and 40 and a negative polarity for the pulse 34.

The transponder 20 produces a pulse, as by magnetic induction, corresponding to each if the pulses, such as the pulses 30, 34 and 40, produced in the reader 14. As previously discussed, the transponder 20 also generates a plurality of signals every time that the reader 14 generates a pulse such as the pulse 30 or the pulse 34. Since the successive pulses such as the pulses 30 and 34 have opposite polarities, the pluralities of signals, such as the signals 32 and the signals 36, generated by the transponder 20 also have opposite polarities.

The transistor 78 operates to pass to ground the negative swings of the signals produced on the upper terminal of the coil 22 in FIG. 4 so that only the positive swings of these signals pass to the voltage limiter 80 through the liner 81. In like manner, the transistor 78 operates to ground the negative portions of the signals produced on the lower terminal of the coil 22 in FIG. 4 so that only the positive swings of such signals pass to the voltage limiter 80 through the line 83.

The amplitudes of the signals introduced to the voltage limiter 80 are limited to produce signals 85 in FIG.

8 and are then introduced to the clock separator 82. The clock separator 82 determines the polarity of the reader pulse associated with each plurality of the signals produced in the coil 22, such as the signals 32 or the signals 36, and generates a clock signal on a particular one of its outputs in synchronism with the occurrence of such pulse. As will be seen, each successive clock signal coincides in time with the pulse from the coil 22 and the polarity of this pulse is opposite to the polarity of the previous pulse since the pulses 30, 34 and 40 have alternate polarities. Clock signals, such as a clock signal 96 in FIG. 8, coincident in time with a positive polarity in the pulse from the coil 22 are introduced from one output line of the clock separator 82 to the format generator 84. Clock signals, such as a clock signal 98 in FIG. 8, coincident in time with a negative polarity in the pulse from the coil 22 are introduced from the other output line of the clock generator 82 to the format generator 84.

In addition to receiving the clock signals from the clock separator 82, the format generator 84 also receives signals from the multiplexer 86. The multiplexer 86 stores a plurality of binary signals each having first and second logic levels respectively coding for a binary "1" and a binary "0". The binary signals in the plurality have a unique code to identify each individual object. For example, the code may have a pattern such as 011010110101 to identify an individual tool from thousands of other tools, the least significant bit in the plurality being at the right.

The successive bits of information stored in the multiplexer 86 are introduced by the multiplexer to the format generator 84 in synchronism with the clock signals of a particular polarity from the clock separator 82. For example, when the first pulse in each sequence, such as the pulse 30 or the pulse 40, has a positive polarity, the next bit in the code from the multiplexer 86 is introduced to the format generator 84 upon the generation of a pulse of positive polarity in the coil 12. Since the multiplexer 86 operates at the beginning of each sequence to shift into the format generator 84 the next bit of the code identifying the object, the multiplexer 86 operates, in effect, as a shift register.

Figure 7:
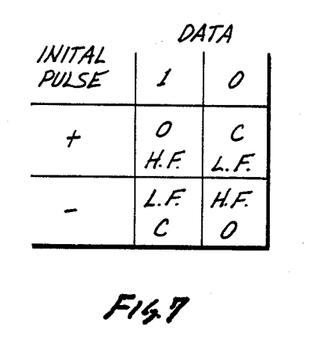
FIG. 7 is one form of truth table illustrating the operation of a format generator included in the transponder shown in FIG. 4.

The format generator 84 produces signals in accordance with the truth table illustrated in FIG. 7. Under certain sets of conditions as specified in the truth table, the format generator 84 generates a signal which causes the transistor switch 72 to become opened (or non-conductive). This will cause the coil 22 to generate signals at the first frequency such as three (3) megahertz. Under other sets of conditions as specified in the truth table, the format generator 84 will generate a signal which will cause the transistor switch 72 to become closed (or conductive). This will connect the capacitance 74 across the coil 22. As a result, the coil 22 will generate signals at the second frequency such as two (2) megahertz.

FIG. 7 illustrates one form of a truth table to show how the format generator 84 responds to the polarity of the clock signals from the clock generator 82 and the binary bits of information from the multiplexer 86 to determine the order in which the signals are generated at the first and second frequencies in each sequence. For example, as indicated in FIG. 7, when a binary "1" is provided by the multiplexer 86 and the polarity of the first clock signal in each sequence is positive, the format generator 84 initially opens the switch 72 in the sequence for times following a positive clock signal. This is indicated by the letter "O" in FIG. 7 to show that the switch 72 is initially opened in the sequence. This causes the signals at the first frequency to be generated in the sequence before the signals at the second frequency are generated in the sequence. Similarly, if a binary "0" is to be generated in a sequence and the polarity of the first clock signal in the sequence is negative, the switch 72 is initially opened in the sequence and is subsequently closed in the sequence. This is indicated by the letter "O" in FIG. 7 for this set of conditions. In FIG. 7, the letter "C" for a set of conditions indicates that the switch 72 is initially closed in a sequence and is then opened in the sequence.

As previously described, the successive pluralities of signals generated by the transponder 20 are received by the reader 14. These signals are demodulated by the frequency detector and demodulator 16 and the demodulated signals are introduced to the line 18. The pattern of the binary 1's and binary 0's in the multiplexer 86 can accordingly be detected by determining the relative time duration of the positive and negative portions of the demodulated signals in each sequence and the polarity of the pulses such as the pulses 30 and 40 at the beginning of each sequence. In effect, the truth table shown in FIG. 7 is reconstructed.

Figure 9:
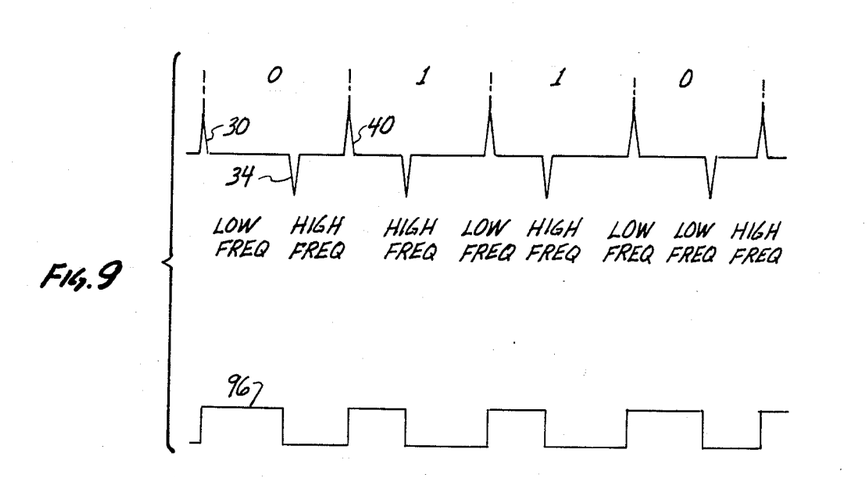
FIG. 9 illustrates the characteristics of signals generated in the reader.

The demodulated signals (also shown at 42 in FIG. 8 for one sequence) are illustrated at 96 in FIG. 9 in relation to the excitation pulses such as the pulses 30, 34 and 40. The detection by the frequency detector and demodulator 16 of the pattern of the binary 1's and binary 0's in the multiplexer 86 is facilitated by the fact that the duration of time between successive pulses of the same polarity, such as the pulses 30 and 40, is substantially constant regardless of the order in which the signals at the first and second frequencies is generated. For example, the sum of the duration of time between the pulses 30 and 34 and between the pulses 34 and the successive pulse 40 (all constituting one sequence) is equal to the sums of the duration of time between the initial pulses in successive sequences.

Figure 3:
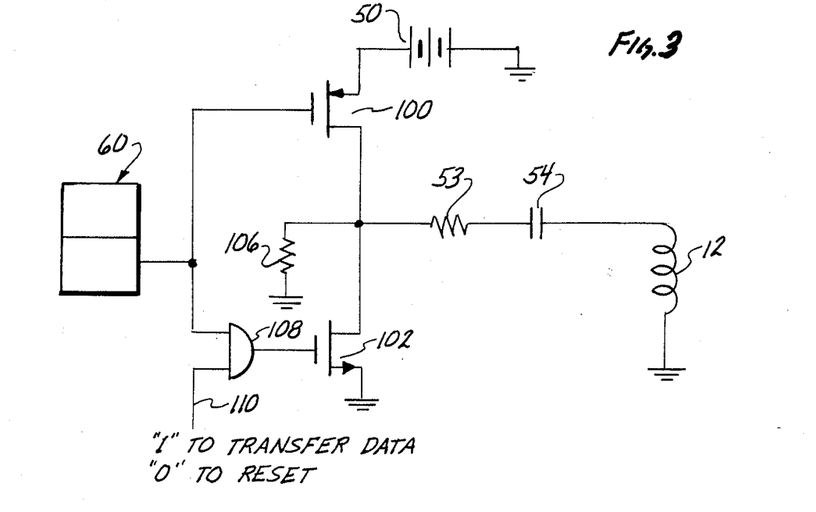
FIG. 3 is a circuit diagram schematically illustrating the construction of additional features in the reader shown in FIG. 1.

It may sometimes happen that the magnetic coupling between the coil 12 in the reader 14 and the coil 22 in the transponder 20 may be interrupted in the middle of the generation of the sequences of signals to identify the object associated with the transponder. This may occur for several reasons. For example, the transponder 20 may be moved out of the effective range of the reader 14 or a member of relatively large size may be disposed between the reader and the transponder to block any magnetic induction between the reader and the transponder. The circuitry shown in FIG. 3 is included in the reader 14 to operate under such circumstances. The circuitry shown in FIG. 3 includes a resistance 106, the resistance 53, the capacitance 54 and the coil 12 shown in FIG. 2. It also includes a pair of transistors 100 and 102 which may collectively comprise the switch 52.

The transistor 100 may comprise a p-channel field effect transistor and the transistor 102 may comprise an n-channel field effect transistor. The source of the p-channel transistor 100 is connected to the power source 50. The drain of the transistor 100 and the drain of the transistor 102 have common connections with the resistance 53 and with one terminal of the resistance 106, the other terminal of which receives the reference potential such as ground. The source of the transistor 102 also receives the reference potential such as ground.

A connection is made from the gate of the transistor 100 to the output terminal of one stage in the astable multivibrator 60. The gate of the transistor 102 receives the output signals from an "and" gate 108. One input terminal of the "and" gate 108 receives the voltage on the same output terminal of the multivibrator 60 as introduces signals to the gate of the transister 100. A second input terminal of the "and" gate 108 receives signals produced on a line 110.

When a signal having a logic level representing a binary "1" is produced on the line 110, the system described above operates to detect at the reader 14 the binary code provided in the multiplexer 86 at the transponder 20. However, when the generation of the sequences of signals from the transponder 20 to the reader 14 is interrupted as by an interruption in the magnetic coupling between the coils 12 and 22, the multivibrator 60 starts to operate on a free running basis at a relatively low frequency. For example, when the signal on the output line from the multivibrator 60 is low, the transistor 100 becomes conductive. This causes a current to flow through a circuit including the voltage source 50, the transistor 100, the resistance 53, the capacitance 54 and the coil 12. This current charges the capacitance 54.

After the capacitance 54 has become charged, it discharges slowly through a circuit including the capacitance, the resistance 53, the resistance 106 and the coil 12. When the signal on the output line from the multivibrator 60 becomes high, this signal passes through the "and" gate 108 and causes the transistor 102 to become conductive. The remaining charge in the capacitance 54 is then discharged through a circuit including the capacitor, the resistance 53, the transistor 102 and the coil 12. In this way, the multivibrator 60 operates on a free running basis at a relatively low frequency. This causes the coil 12 to generate pulses at the relatively low frequency to activate the transponder 20 when the transponder is moved relative to the reader within magnetically inductive range relative to the reader 14.

It may sometimes be desired to interrupt the dialog between the reader 14 and the transponder 20 while the reader and the transponder are in the middle of this dialog. To provide such an interruption, a signal having a logic level of "0" is produced on the line 110. This inactivates the "and" gate 108. This causes the charge produced in the capacitance 54 to discharge slowly through the circuit including the capacitance 54, the resistances 53 and 106 and the coil 12. Because of this slow discharge, negative pulses corresponding to the pulse 34 in FIG. 8 are not produced in the coils 12 and 22.

A reset generator 99 is connected between the clock separator 82 and the multiplexer 86 in FIG. 4. The reset generator 99 is responsive to the production of clock signals of alternate polarity by the clock separator 82. Thus, when a negative pulse such as the pulse 34 is not generated by the coils 12 and 22 for a particular period of time such as a period greater than the period between the pulses 30 and 40 (but less) than twice this period), the reset generation 99 operates to reset the multiplexer 86. In this way, a new operation in identifying the object individual to the code in the multiplexer 86 can be initiated.

The coil 12 produces a pulse every time that the capacitance 54 charges or discharges through the coil as discussed in the previous paragraph. These pulses interrogate the area within the effective range of the coil 12. If there is any transponder within this area and the coil 12 in the reader 14 points toward this transponder, an electronic dialog is instituted between the reader and such transponder, as discussed in detail above, to determine the indentity of the object at such transponder. In this way, by producing pulses at a relatively low frequency as discussed above, the circuitry shown in FIG. 4 is ready at any instant to initiate an identification of the object at the transponder 14 in accordance with the unique code provided in the multiplexer 86. This identification is initiated by providing on the line 110 a signal having a logic level coding for a binary "1".

Figure 5:
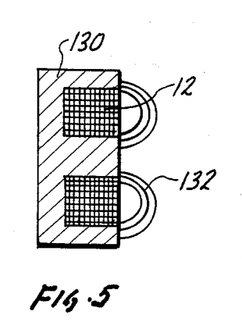
FIG. 5 is a sectional view, in front elevation, illustrating the construction of one of the members, including cores and coils with magnetic properties, which are included in the reader and transponder to provide a magnetic coupling between the reader and the transponder.
Figure 6:
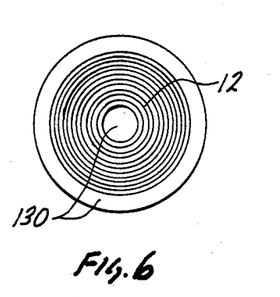
FIG. 6 is a view in side elevation of the magnetic member shown in FIG. 5.

FIGS. 5 and 6 illustrate the construction of the magnetic members, including the coil 12, at the reader 14. A similar construction may be provided for the magnetic members, including the coil 22, at the transponder 20. At the reader 14, the coil 12 is wound on a core 130 having an E-shape in section. The coil 12 is disposed on the middle leg of the core 130 and is shielded within the end legs. In this way, when the coil 12 is energized, it produces leakage flux indicated at 132 in FIG. 5. This leakage flux extends from the core 130 in a controlled direction. This leakage flux is magnetically coupled to the coil 22 at the transponder 20 to induce signals in the coil 22 when the coil 22 at the transponder is within the effective range of the coil 12 at the reader 14.

The reader coil 12 is included in a circuit which includes the resistance 53. This causes the pulses, such as the pulses 32 and 36, produced in the coil 22 to be damped. On the other hand, the coil 22 is connected in a resonant circuit which includes the capacitance 24 (and an additional capacitance if necessary) to generate the signals at the first frequency and which includes the capacitances 24 and 74 to generate the signals at the second frequency. Furthermore, the signals produced by the coil 22 are not damped by any added resistance. The coil 22 is also loosely coupled to the coil 12. For these reasons, the coil 22 is able to generate a plurality of signals every time that the coil 12 generates a pulse.

The system described above is self synchronous. This results from the fact that the reader 14 produces clock signals, such as the clock signals 96 and 98, at a particular time in each of the pluralities of signals generated by the coil 22. It also results from the fact that each sequence of signals generated at the first and second frequencies has the same time duration. It also results from the fact that the coil 12 responds to the signals produced in the coil 22 to produce a new pulse after each particular count of such signals and that the coil 22 responds to each pulse generated by the coil 12 to generate the plurality of signals. The system is accordingly self synchronous even though no clock signals are externally generated.

The system shown in the drawings and described above also has other important advantages. For example, the transponder 20 does not require an external source of energy since it receives its energy from the pulses generated by the coil 12. Furthermore, the reader 14 receives a minimal amount of energy since the pulses such as the pulses 32, 36 and 40 have a relatively short duration compared to the relatively long interval between successive pairs of pulses.

The system is also advantageous because it is relatively immune to extraneous noises and to small obstacles in the transmission path. This results from several factors. For example, the coils 12 and 22 are responsive only to magnetic signals emanating directly toward the openings in the cores upon which they are wound. Furthermore, the information is generated in the form of frequency modulated codes at specific frequencies such as the first and second frequencies. Another factor is that the reader 14 generates each pulse only after it has counter a particular number of signals generated at each of the first and second frequencies by the coil 22.

The system shown in the drawings and described above is also relatively fast. This results partly from the fact that the transponder 20 responds instantaneously to the pulses generated in the reader 14. It also results from the fact that the reader 14 responds instantaneously to the signals generated by the transponder 20. It further results from the fact that substantially all of the components in the reader 14 can be disposed on a first integrated circuit chip 100 and that this chip is of relatively small size. Another contributing factor is that substantially all of the components in the reader 20 can be disposed on an integrated circuit chip 102 and that this chip is of relatively small size.

The system described above is also quite tolerant of variations in component values. This facilitates the relative ease with which the reader 12 and the transponder 22 can be manufactured in quantity. The relative ease of manufacture is enhanced by the manufacture of the reader 14 on the integrated circuit chip 100 (FIG. 10) and the manufacture of the transponder 22 on the integrated circuit chip 102 (FIG. 11).

Although the system has been described above with reference to identifying an object, the system can be used to generate any type of information. This can be accomplished by eliminating the multiplexer 86 and introducing directly to the format generator 84 signals generated externally to the transponder in binary coded form to represent the information to be identified. Alternatively, the externally generated information can be introduced to the multiplexer 86, which stores such information and then introduce such information to the format generator 84 by operating as a shift register.

Figure 10:
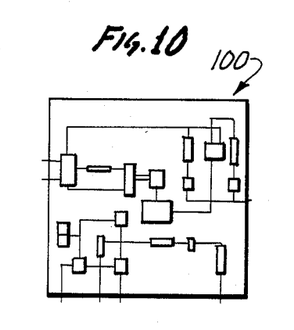
FIG. 10 schematically illustrates an integrated circuit chip which incorporates substantially all of the components of the reader.

The system shown in the drawings and described above is also advantageous because virtually all of the components in the reader can be disposed on integrated circuit chip 100 in FIG. 10. The integrated circuit chip 100 in FIG. 10 is illustrated only schematically and can be considered to include all of the components in FIGS. 2 and 3 except for the coil 12 and, in some cases, the capacitance 54. The capacitance 54 may not be considered to be included in the integrated circuit chip 100 because it is a charging capacitor and accordingly has a relatively high value.

Figure 11:
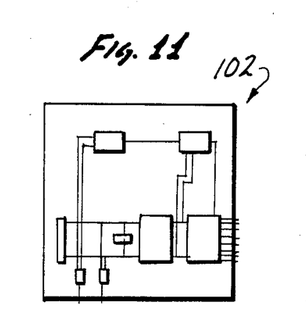
FIG. 11 schematically illustrates an integrated circuit chip which incorporates substantially all of the components of the transponder.

Similarly, virtually all of the components in the transponder 20 can be disposed on the integrated chip 102 in FIG. 11. The integrated circuit chip 102 in FIG. 11 is also illustrated schematically. All of the components shown in FIG. 4 (except for the coil 22) are included in the integrated circuit chip 102.

By disposing virtually all of the components in the reader 14 on the integrated circuit chip 100 and all of the components in the transponder 20 on the integrated circuit chip 102, the reader and the transponder can occupy minimal spaces. This allows the transponder 20 to be disposed inconspicuously on an object to be identified. It also allows the reader 14 to be carried conveniently in a pocket until it is desired to be used. The disposition of the reader 14 and the transponder 20 on integrated circuit chips also allows the reader and the transponder to be duplicated with substantially identical characteristics and to operate at relatively high frequencies.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim.

1. In combination for generating information,
   a reader disposed at a first position,
   a transponder disposed at a second position displaced from the first position,
   means magnetically coupling the reader and the transponder,
   means in the reader for producing magnetic pulses to initiate a sequence of cyclic inter-actions between the reader and the transponder,
   means in the transponder for providing a binary code indentifying the information,
   means in the transponder for producing in each of the cyclic inter-actions signals having each of first and second frequencies in a sequence dependent upon the binary code in the transponder, and
   means responsive to the signals produced by the transponder at one of the first and second frequencies in each of the cyclic inter-actions for producing a pulse in the magnetically coupling means to initiate in the reader the signals in the other one of the first and second frequencies in such cyclic inter-actions.

2. In a combination as set forth in claim 1,
   means responsive to the signals produced by the transponder at the first and second frequencies for alternately producing the pulses in the coupling means with first and second opposite polarities in the successive cycles of inter-actions, and
   means responsive at the transponder to the polarities of the pulses in the successive cycles of operations and to the binary code identifying the information for producing in each cycle of inter-actions the signal at the first and second frequencies in a particular order relative to the successive pulses.

3. In a combination as recited in claim 2 wherein the information identifies an object and wherein the binary code means provides a pre-selected binary code for identifying the object and wherein means are included for demodulating the signals at the first and second frequencies in each sequence to provide a signal having characteristics identifying the object.

4. In combination for generating information,
   a reader disposed at a first position,
   a transponder disposed at a second position displaced from the first position,
   means at the reader for producing a first pulse,
   means responsive at the transponder to the first pulse from the reader for producing a series of signals having an individual one of first and second frequencies dependent upon the polarity of the first pulse and upon the information being generated,
   means responsive at the reader to the series of signals of the individual one of the first and second frequencies from the transponder for producing a pulse of an opposite polarity to the first pulse produced by the reader, and
   means responsive at the transponder to the pulse of the opposite polarity for producing signals with the other one of the first and second frequencies in the sequence,
   the pulse means and the signal means specified above being operative to obtain the generation of successive sequences of the signal with the first and second frequencies to identify the information.

5. In combination as set forth in claim 4,
the pulse means at the reader including means for counting, in each sequence, a particular number of signals at the first frequency and a particular number of signals at the second frequencies before initiating the next sequence.

6. In a combination as set forth in claim 4,
means at the reader for demodulating the signals at the first and second frequencies in each sequence to produce a pulse demodulated signal, and
means responsive to the pulse-demodulated signal for recovering the information.

7. In combination for identifying an object,
a reader displaced from the object,
a transponder at the object,
first means at the reader for producing a pulse,
second means at the transponder for providing indications in binary form to identify the object,
third means responsive at the transponder to the indications from the second means and to the pulse for obtaining the production of signals having an individual one of first and second frequencies,
fourth means responsive at the reader to the signals at the individual one of the first and second frequencies for producing a pulse having a polarity opposite to that of the first pulse, and
fifth means responsive at the transponder to the pulse of opposite polarity for obtaining the production of the signals at the other one of the first and second frequencies.

8. In a combination as set forth in claim 7,
the third, fourth and fifth means being operative through a plurality of sequences to obtain the production of the signals at the first and second frequencies in each of such sequences in an order dependent upon the code in binary form.

9. In a combination as set forth in claim 8,
means responsive at the reader to the order of the signals at the first and second frequencies in each sequence for providing an indication of the unique code at the transponder.

10. In combination for identifying an object,
a transponder at the object,
a reader displaced from the object,
means at the transponder for providing in binary coded form a sequence of binary coded indications in a unique pattern indentifying the object,
means at the reader for producing a pulse,
means responsive at the transponder to each pulse from the reader for producing a plurality of signals having one of two individual frequencies,
means responsive at the reader to each plurality of signals from the transponder for producing a pulse of a polarity opposite to the polarity of the previous pulse produced at the reader, and
means responsive to the polarity of each pulse from the reader and to each binary coded indication in the sequence for providing controlled productions of signals at the two individual frequencies in each sequence in an order representative of the binary coded indications.

11. In a combination as set forth in claim 10,
means at the reader for interrupting the generation of the signals in the sequences at the first and second frequencies upon a failure of the reader to receive the signals from the transponder and for subsequently obtaining the initiation of new sequences in the generation of the signals at the first and second frequencies.

12. In a combination as set forth in claim 11,
means at the reader for counting a particular number of the signals at the individual ones of the first and second frequencies before obtaining the production of the next pulse at the reader, and
means at the reader for demodulating the signals at the first and second frequencies to indicate the sequence of the binary coded indications at the transponder.

13. In combination at a transponder for identifying an object in accordance with a sequence of pulses of opposite polarities from a reader,
means responsive to the pulses from the reader for identifying the polarities of the pulses,
means for providing a code identifying the object in binary coded form,
means responsive to the pulses from the reader for generating a plurality of signals at a first frequency,
a capacitance,
switching means having first and second states of operation and connected to the signal-generating means and the capacitance for operation of the switching means between the first and second states to obtain a change in the frequency of the generated signals to a second frequency different from the first frequency, and
means responsive to the identifying code and to the polarity of each of the pulses from the reader for controlling the operation of the switching means to the first and second states to obtain the generation of signals at the first and second frequencies in sequences indicative of the identifying code.

14. In a combination as set forth in claim 13,
means magnetically responsive to the pulses and constructed to generate the plurality of signals at the transponder at an individual one of the first and second frequencies in response to each pulse from the reader.

15. In a combination as set forth in claim 14,
means responsive to the signals generated at the transponder at the individual ones of the first and second frequencies for producing clock signals of opposite polarities at particular times in such generation of the signals at the transponder and the controlling means being responsive to the polarities of such clock signals to obtain the generation of the signals at the first and second frequencies in the sequences indicative of the identifying code.

16. In combination at a reader for use with a transponder in identifying an object where the transponder produces sequences of signals at first and second frequencies,
means at the reader for generating a pulse,
means responsive at the reader to the sequences of signals produced in the transponder at each of the first and second frequencies for counting the numbers of signals at such one of the first and second frequencies,
means responsive at the reader to a particular count in the number of signals at each of the first and second frequencies in each sequence for obtaining the generation at the reader of a pulse having a polarity opposite to that of the previous pulse,
means at the reader for demodulating the signals at each of the first and second frequencies to obtain an identification of the object, and means at the reader for obtaining a transmission of the pulses to the transponder to control the generation of the signals at each of the first and second frequencies at the transponder.

17. In a combination as set forth in claim 16,
means at the reader for interrupting the generation of the pulses at the reader at any time in the middle of the generation of such pulses when the reader fails to receive the signals from the transponder, and
means at the reader for instituting a new sequence of generation of pulses after the interruption in the generation of the pulses in the previous sequences.

18. In a combination as set forth in claim 16,
means responsive at the reader to the interruption in the generation of the pulses upon the failure of the reader to receive the signals from the transponder for thereafter generating pulses at a frequency less than the frequency of generation of the pulses at the reader in response to the signals at the first and second frequencies.

19. In combination at a reader for use with a transponder in identifying an output member at the transponder where the transponder produces sequences of signals at first and second frequencies,
energy storage means,
switching means having first and second operative relationships,
means including the energy storage means and the switching means for providing a storage of energy in the energy storage means in the first operative relationship of the switching means and for providing a discharge of the energy in the energy storage means in the second operative relationship of the switching means,
means for producing a pulse of a first polarity for transmission to the transponder upon each charge of energy in the energy storage means and for producing a pulse of a second polarity for transmission to the transponder upon each discharge of the energy storage means, and
means responsive to the signals of the first and second frequencies for obtaining an operation of the switching means alternately in the first and second relationships.

20. In a combination as set forth in claim 18,
means at the reader for counting to a particular count the signals generated at each of the first and second frequencies at the transponder,
the signal-generating means being operative at each particular count in the counting means to operate the switching means to the alternate relationship from that is which the switching means has previously been operative.
means responsive at the reader to the signals at the first and second frequencies for demodulating such signals to produce signals identifying the object.

21. In a combination as set forth in claim 20,
means for interrupting the generation of the pulses when the count of the signals at the first and second frequencies fails to reach the particular count, and
means for generating pulses, upon an interruption in the generation of the pulses in accordance with the failure of the count of the signals at each of the first and second frequencies to reach the particular count, at a frequency lower than the frequency of the pulses generated during the count of the signals at each of the first and second frequencies to the particular count.

22. In combination at a reader for use with a transponder in identifying an object at the transponder where the transponder produces sequences of signals at first and second frequencies,
energy storage means,
switching means having first and second operative relationships,
means including the energy storage means and the switching means for providing for a storage of energy in the energy storage means in the first operative relationship of the switching means and for providing for a discharge of the energy in the energy storage means in the second operative relationship of the switching means,
means for producing a pulse of a first polarity for transmission to the transponder upon each charge of energy in the energy storage means and for producing a pulse of a second polarity upon each discharge of energy in the energy storage means,
a stable multivibrator means operatively coupled to the switching means and associated with the switching means for alternately obtaining the operation of the switching means in the first and second operative relationship,
means responsive at the reader to the signals at the first and second frequencies from the transponder in the coupled relationship with the transponder for producing signals at such frequencies at the reader,
the astable multivibrator means being operative in response to the signals at the first and second frequencies at the reader during the coupling of the transponder to the reader to obtain the alternate operation of the switching means in the first and second operative relationships at a particular rate,
means associated with the switching means and the astable multivibrator means to obtain the operation of the switching means alternately in the first and second operative relationships, in the absence at the reader of the signals at the first and second frequencies, at a rate less than the particular rate, and
means for identifying the object at the transponder in accordance with the relative times between the generation at the reader of the successive pulses during the coupling of the transponder to the reader.

23. In a combination as set forth in claim 22,
means for interrupting the generation of the pulses at the particular rate when the reader fails to receive the signals at the first and second frequencies from the transponder, and
means for thereafter initiating a new sequence in the generation of the pulses at the particular rate in response to the reception at the reader of the signals from the transponder at one of the first and second frequencies.

24. In a combination as set forth in claim 23,
means at the reader for counting a particular number of signals at each of the first and second frequencies during the coupling of the transponder to the reader, and
means responsive to the particular count in the signals at the first and second frequencies for alternately producing the pulses of opposite polarities,
the identifying means being operative to demodulate the signals at the first and second frequencies.

25. In combination for providing an identification of an object,
a reader,
a transponder displaced from the reader,
a first coil at the reader, the first coil being constructed to provide a considerable damping in pulses produced by such coil,
a second coil disposed at the transponder in magnetically coupled relationship to the first coil, the second coil being constructed to respond to each pulse from the first coil to generate a series of signals at a particular one of first and second frequencies,
means at the reader for producing pulses in the first coil to obtain a generation of series of signals in the transponder at the first and second frequencies,
means responsive to each generation of a series of signals by the second coil for obtaining the generation of the next pulse by the first coil,
means operatively coupled at the transponder to the second coil for obtaining the generation of the series of signals individual ones of the first and second frequencies,
means for providing in binary form at the transponder a code identifying the object,
means responsive at the transponder to the binary code for controlling the sequences in which the series of signals are generated at the first and second frequencies at the transponder, and
means responsive at the reader to the sequences of signals at the first and second frequencies for demodulating the signals to identify the object.

26. In a combination as set forth in claim 25,
means at the reader for storing and discharging energy,
means at the reader for obtaining the charge of the energy-storing means after the generation of alternate pulses at the reader, and for discharging such energy after the generation of the other pulses at the reader, to obtain the production of the pulses by the first coil alternately with opposite polarities, and
means at the transponder for controlling the sequences of the production of the signals at the first and second frequencies in accordance with the polarities of the pulses produced by the first coil and in accordance with the binary code.

27. In a combination as set forth in claim 26,
means at the reader for counting a particular number of signals at each of the first and second frequencies, and
means responsive at the reader to each particular count in the signals at each of the first and second frequencies for obtaining the operation of the energy-storing means in the alternate one of the charging and discharging modes.

28. In combination for identifying an object,
a reader,
a transponder displaced from the reader and disposed at the object,
first means disposed at the reader and including an E-shaped core and a coil wound on the core, the first means being constructed to provide a damped generation of pulses,
second means disposed at the transponder and including an E-shaped core and a coil wound on the core, the second means being constructed to be disposed in magnetically coupled relationship to the E-shaped core at the reader, the second means being constructed to generate a series of signals in response to each pulse from the first means,
means disposed at the transponder and responsive to the pulses generated by the first means for obtaining the production of signals by the second means at individual ones of first and second frequencies,
means at the transponder for providing a binary code identifying the object,
means disposed at the transponder and responsive to the binary code for controlling the generation of the signals at the individual ones of the first and second frequencies in each sequence,
means disposed at the reader and responsive to the generation of the signals at the individual ones of the first and second frequencies in each sequence for obtaining the generation of the pulses by the first means, and
means disposed at the reader and responsive to the signals at the individual ones of the first and second frequencies in each sequence for recovering the binary code.

29. In a combination as set forth in claim 28,
means at the reader for providing for the generation of alternate ones of the pulses with polarities opposite to those of the other generated pulses,
the sequence-controlling means at the transponder being responsive to the polarities of the generated pulses and to the binary code for controlling the order in which the signals at the first and second frequencies are generated in each sequence.

30. In a combination as set forth in claim 28,
means at the reader for obtaining an interruption in the generation of the pulses by the first means when the first means fails to receive the sequences of the signals at the first and second frequencies from the second means, and
means disposed at the reader and associated with the interrupting means for initiating the generation of a new sequence of pulses by the first means.

31. In combination for providing an identification of an object,
a reader,
a transponder displaced from the reader in an operatively coupled relationship to the reader,
means at the reader for generating a series of pulses in the reader,
means disposed at the transponder and responsive to each pulse generated at the reader for generating a series of signals in the transponder at an individual one of first and second frequencies,
means disposed at the reader and responsive to each generation of the series of signals in the transponder at the individual one of the first and second frequencies for obtaining the generation of another pulse in the series,
means for providing in binary form at the transponder a code identifying the object,
means responsive at the transponder to the binary code for controlling the generation of the signals at the individual ones of the first and second frequencies in each sequence, and
means responsive at the reader to the sequences of signals generated at the individual ones of the first and second frequencies in each sequence for demodulating the signals to identify the object.

32. In a combination as set forth in claim 31, the pulse-generating means at the reader providing for the alternate generation of pulses of a first polarity and then of a second polarity, and the controlling means being responsive to the signals from the last mentioned means and to the binary code for controlling the generation of the signals at the individual ones of the first and second frequencies in each sequence.

33. In a combination as set forth in claim 32, means at the reader for counting the signals at the individual ones of the first and second frequencies in each sequence, and means at the reader for obtaining the generation of another pulse in the series upon each occurrence of a particular count of the signals by the last mentioned means.

34. In combination at a reader for use with a transponder in identifying information where the transponder produces, at a first rate, signals alternately at first and second freqeuncies to identify the object, means at the reader for obtaining a generation of pulses having a second rate less than the first rate, means associated at the reader with the pulse-generating means for transmitting the pulses at the first rate to the transponder and for receiving the signals at the first and second frequencies from the transponder, means responsive at the reader to the signals at the first and second frequencies from the transponder for adapting the operation of the pulse-generating means to obtain a generation of the pulses at the first rate, means responsive at the reader to the signals received at the first and second frequencies for demodulating such signals to obtain an identification of the information, and means for producing the pulses at the second rate when the reader fails to receive the signals from the transponder.

35. In a combination as set forth in claim 34, the pulse generating means being operative to generate the pulses at the first rate, and at the second rate, alternatively with one polarity and then with the opposite polarity, and means for counting the number of signals received at the reader at each of the first and second frequencies and for obtaining the generation of another pulse upon each occurrence of a particular count.

36. In a combination as set forth in claim 5, means at the reader for interrupting the generation of the pulses at the first rate when the reader fails to receive the particular count of the signals at each of the first and second frequencies from the transponder.

37. In combination at a transponder for generating information in accordance with a sequence of pulses of alternating polarity from a reader, means for receiving the pulses from the reader and for generating a plurality of signals in response to each of such received signals, means responsive to the received pulses for indicating the polarity of such received pulses, means for providing in binary coded form signals identifying the information, and means responsive to the signals in the coded form and to the indications of the polarity of the received pulses for producing, in successive sequences, signals at first and second frequencies in an order dependent upon the binary code and the polarity of the received pulses, the pulse-receiving means also being operative at the transponder to transmit the signals at the individual ones of the first and second frequencies to the reader.

38. In a combination as set forth in claim 37, means responsive at the transponder to the received pulses for generating clock signals, the signal-producing means being operative to produce the signals in synchronism with the clock signals, each of the sequences including signals at the first frequency and signals at the second frequency, the signal-generating means being operative to produce the signals at the first frequency and at the second frequency in a particular order for a binary "1" upon the reception of a positive pulse and to produce the signals at the first frequency and at the second frequency in a reverse order for a binary "1" upon the reception of a negative pulse.

39. In a combination as set forth in claim 38, the receiving means including a coil, and the signal-generating means including a capacitance and switching means having open and closed relationship, the receiving means, the signal-generating means and the capacitance being connected in a circuit to provide for the generation of the signals at the first frequency with the switch in the open relationship and for the generation of the signals at the second frequency with the switch in the closed relationship.

40. In combination at a transponder for identfying an object in accordance with a sequence of pulses from a reader, the transponder including a coil for receiving the pulses from the reader and for generating a plurality of signals at an individual one of a first frequency and a second frequency upon each generation of a pulse at the reader, an integrated circuit chip, means disposed on the integrated circuit chip for identifying the polarity of the pulses received by the coil at the transponder, means disposed on the integrated circuit chip for identifying the object in a binary coded, and means disposed on the integrated circuit chip and responsive to the polairty of the received pulses and the binary code for controlling the generation of the signals at the individual ones of the first and second frequencies in sequences identifying the object.

41. In a combination as set forth in claim 40, means disposed on the integrated circuit chip for resetting the identifying means upon a completion of the generation of the signals by the transponder at the first and second frequencies to identify the binary code or upon an interruption of the transmission of the pulses from the reader.

42. In a combination as set forth in claim 40, the frequency-controlling means including a capacitance disposed on the integrated circuit chip to control the generation of the signals at the first and second frequencies and further including a format generator disposed on the integrated circuit chip for controlling the generation of the signals at the individual ones of the first and second frequencies in each sequence.

43. In a combination as set forth in claim 42,
the binary code means being constructed to provide a binary code in a plurality of binary bits and to provide a shift in the binary bit controlling the operation of the format generator in controlling the generation of the signals at the individual ones of the first and second frequencies in each sequence when the signals at the individual ones of the first and second frequencies in each sequence has been generated.

44. In combination at a reader for use with a transponder in identifying an object where the transponder generates signals at first and second frequencies and where the reader includes a coil for generating pulses and for receiving the signals generated at the first and second frequencies,
an integrated circuit chip,
means disposed on the integrated circuit chip for counting the number of signals received by the reader at each of the first and second frequencies,
a capacitance,
means disposed on the integrated circuit chip for obtaining a charging of the capacitance,
means disposed on the integrated circuit chip for obtaining a discharge of the capacitance,
means disposed on the integrated circuit chip for controlling the charge and discharge of the capacitance, and
means responsive to each particular count of the signals at the first and second frequencies for changing the operation of the controlling means to obtain alternately a charge and a discharge of the capacitance.

45. In a combination as set forth in claim 44,
means disposed on the integrated circuit chip for providing for an alternate charging and discharging of the capacitance at a relatively low frequency when the reader does not receive the particular count of the signals at the first and second frequencies.

46. In a combination as set forth in claim 44 wherein:
the transponder generates the signals at the first and second frequencies in an order representative of information identifying the transponder and wherein
the reader includes means disposed on the integrated circuit chip for demodulating the signals at the first and second frequencies to identify the transponder.

47. In a combination as set forth in claim 46 wherein
the demodulating means means on the integrated circuit chip includes an astable multivibrator having first and second states of operation and wherein the astable multivibrator is associated with the counting means and is responsive to the particular count of the signals by the counting means at each of the first and second frequencies to become operative alternatively in the first and second states and wherein the astable multivibrator is associated with the capacitance to obtain a charging of the capacitance in the first state of operation and to obtain a discharge of the capacitance in the second state of operation.

* * * * *